Oct. 13, 1925.
C. L. LEE
MOLDING MACHINE
Filed May 9, 1923     11 Sheets-Sheet 7
1,556,699
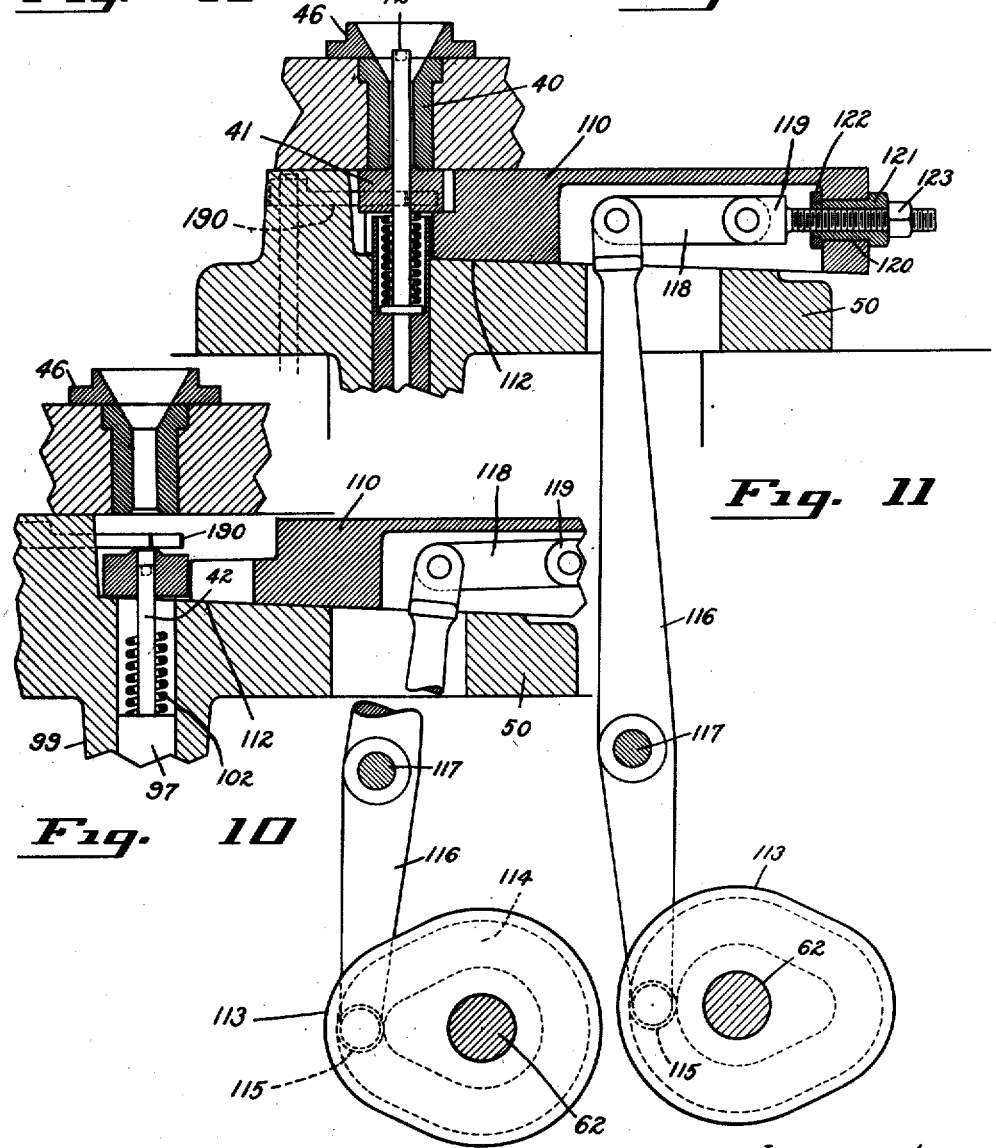

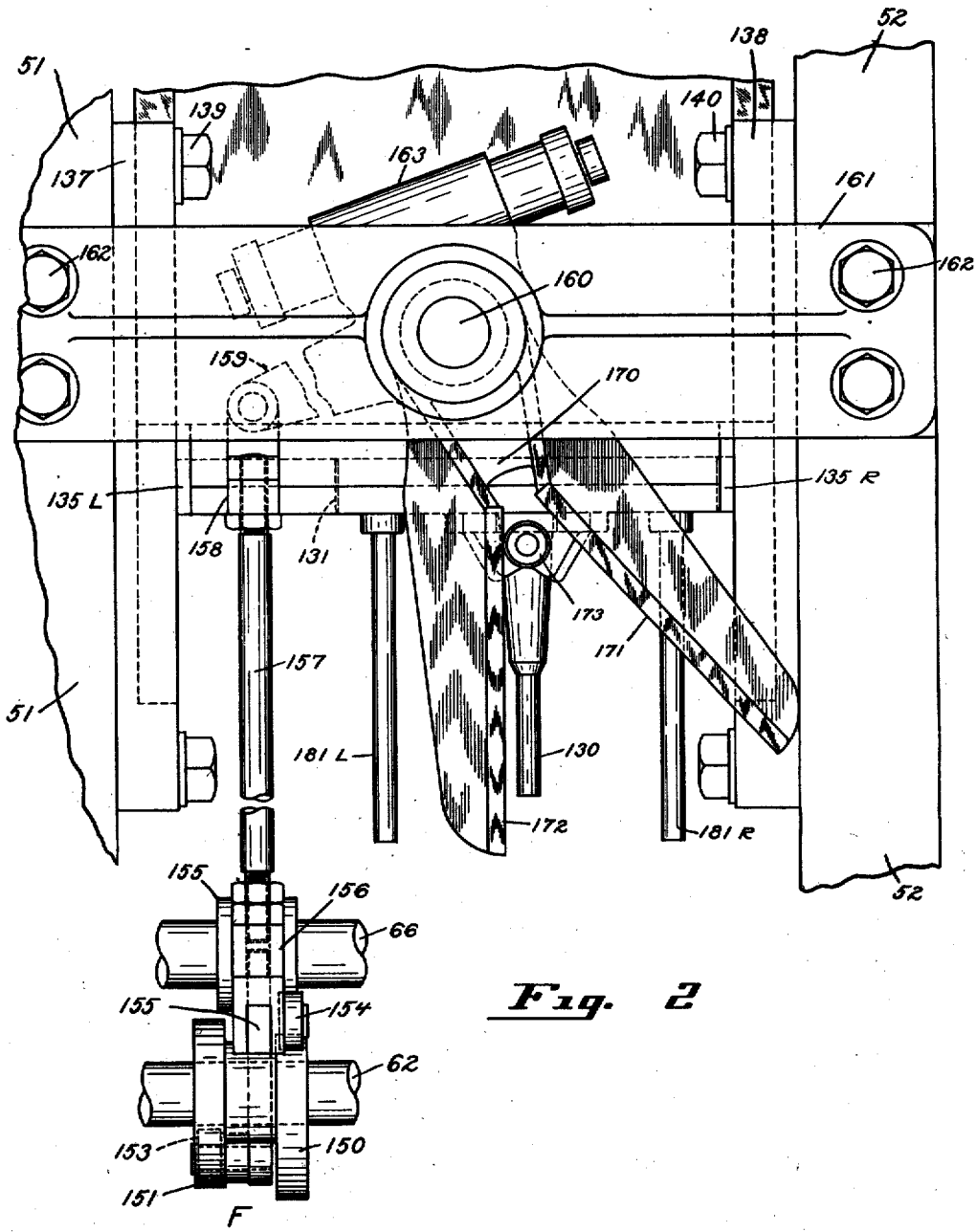

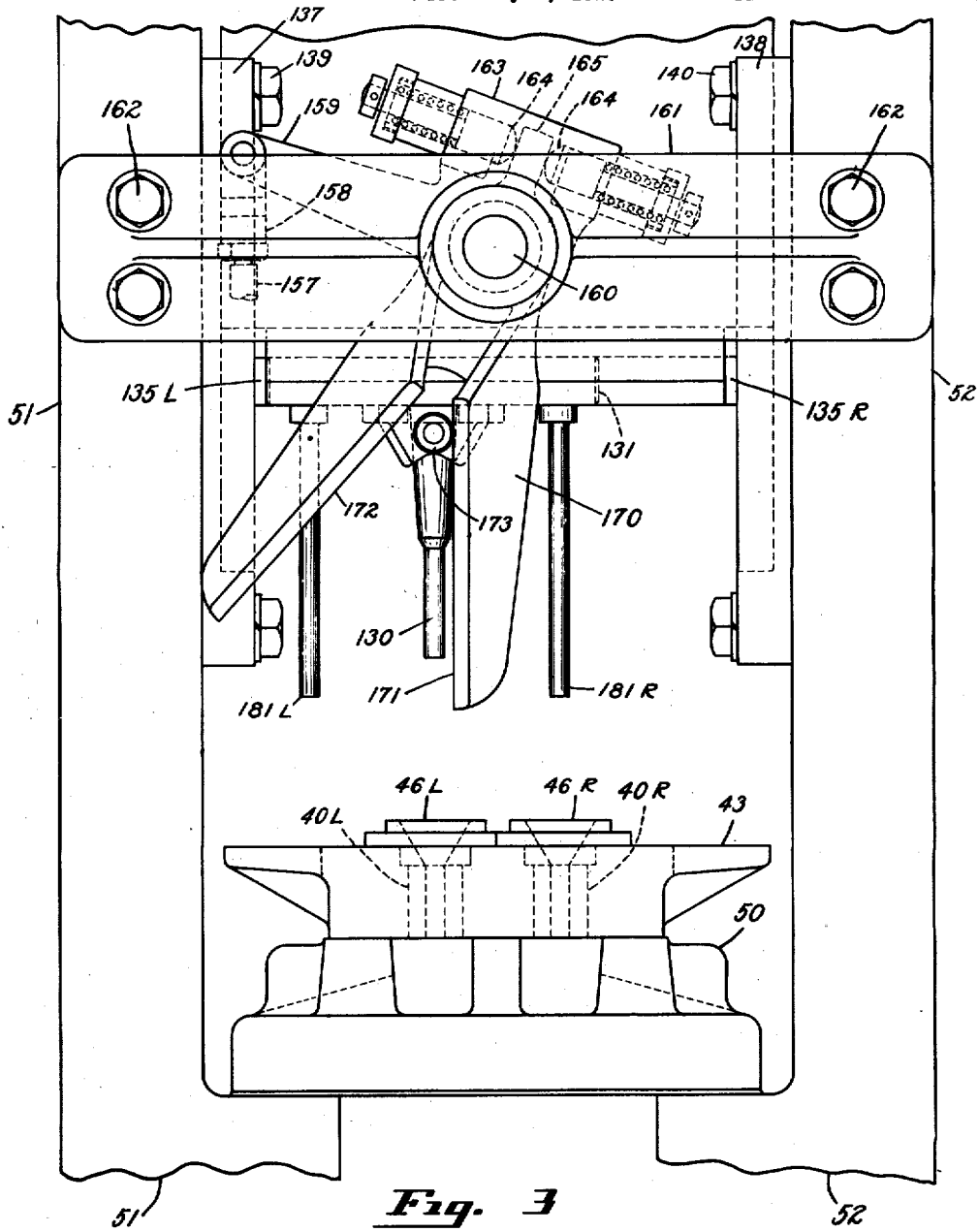

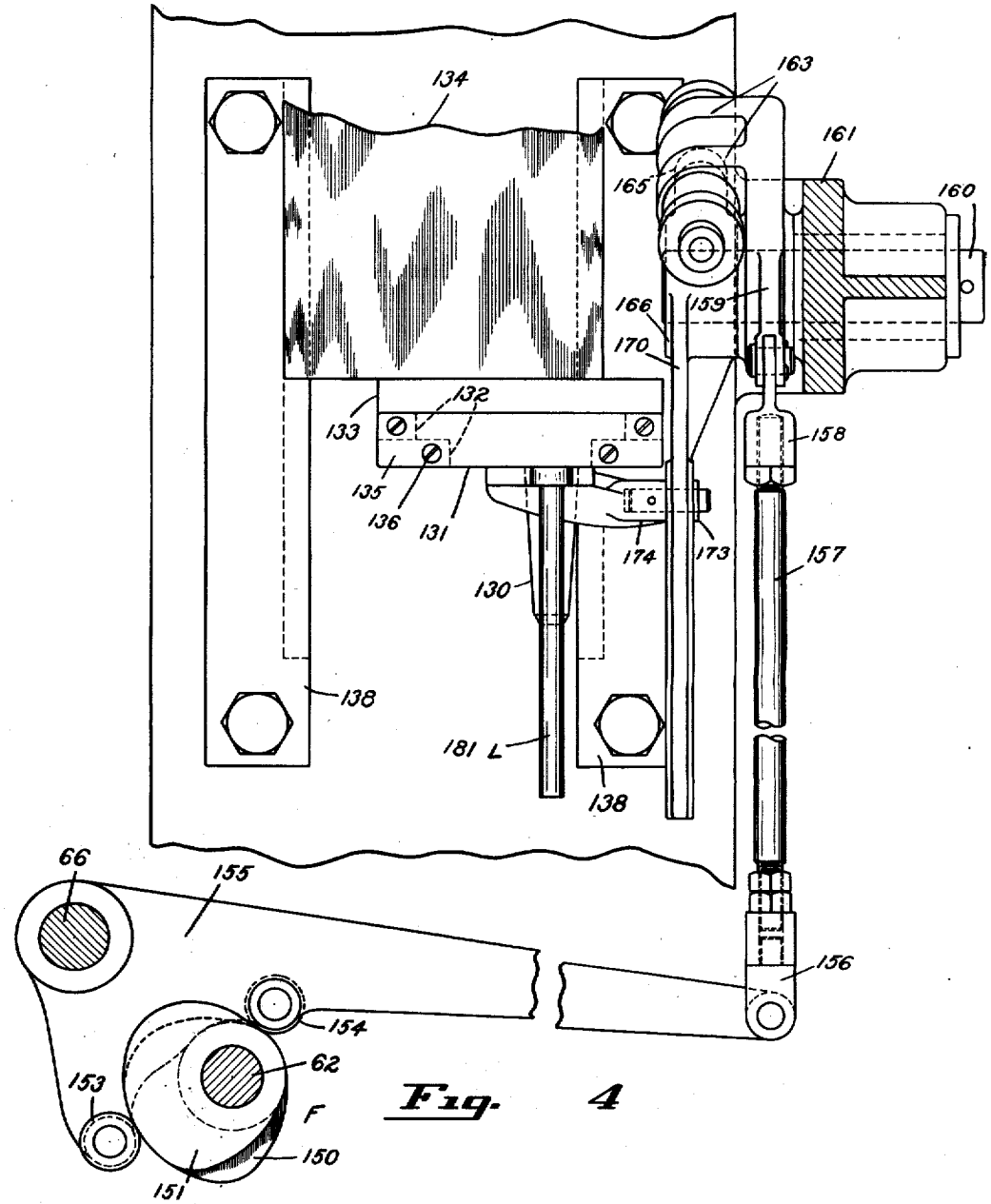

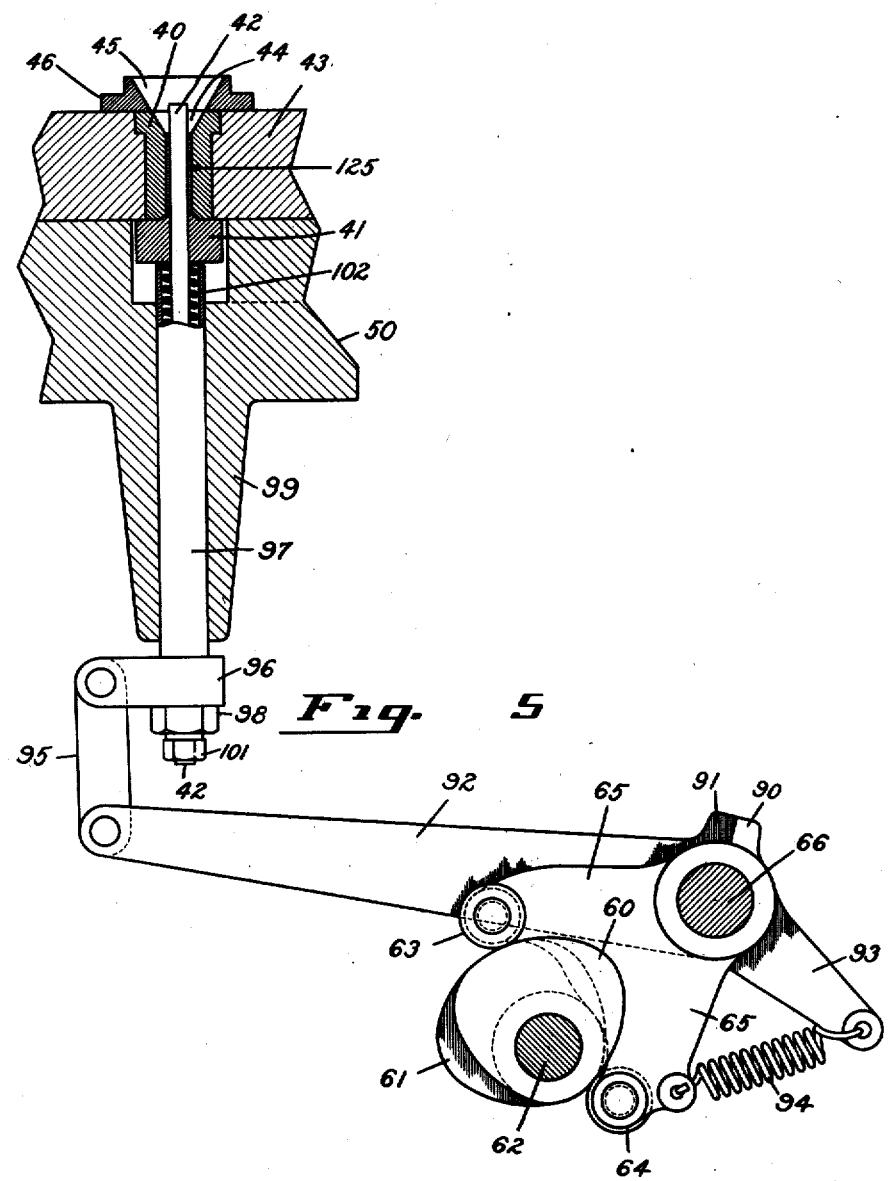

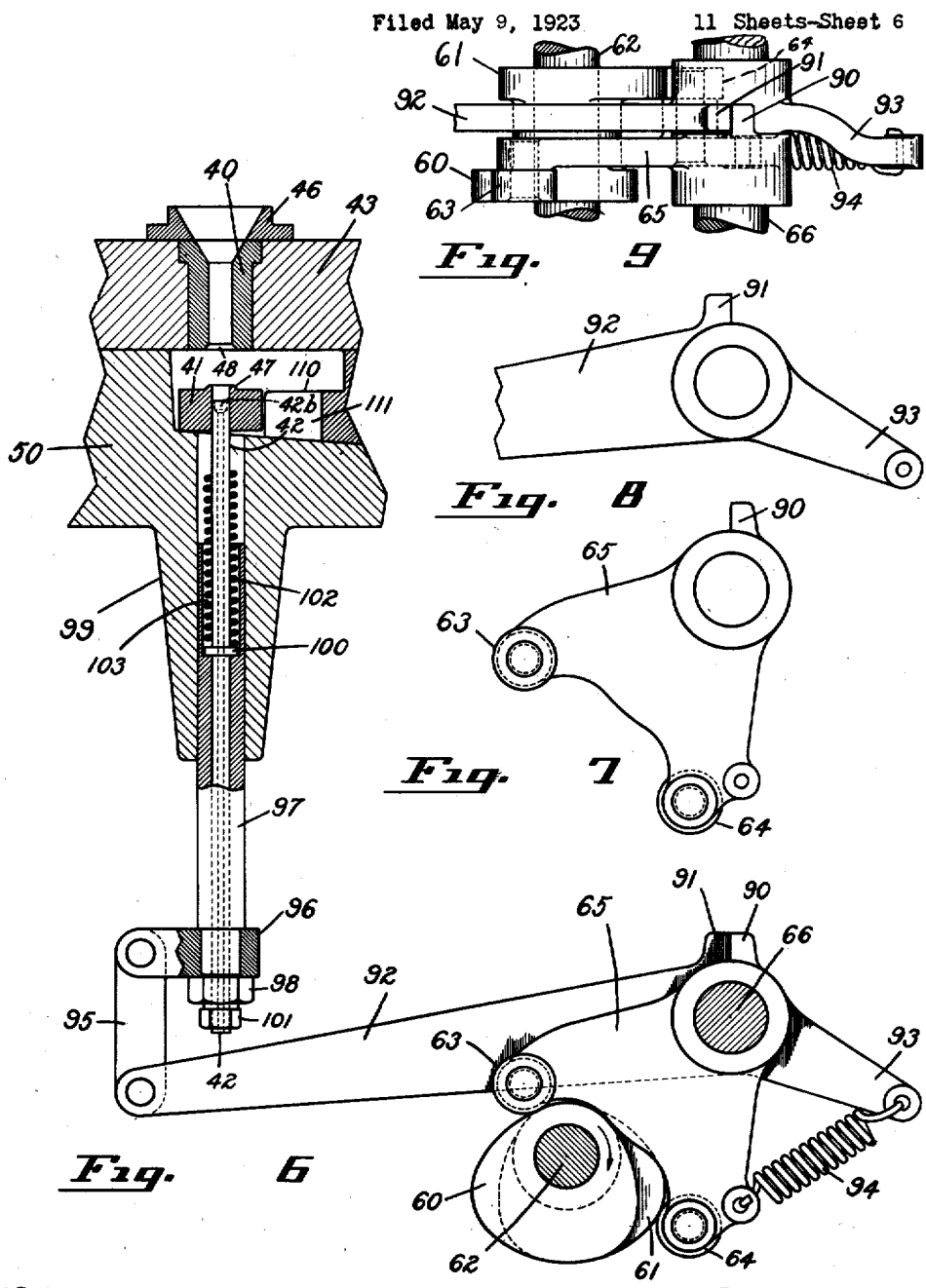

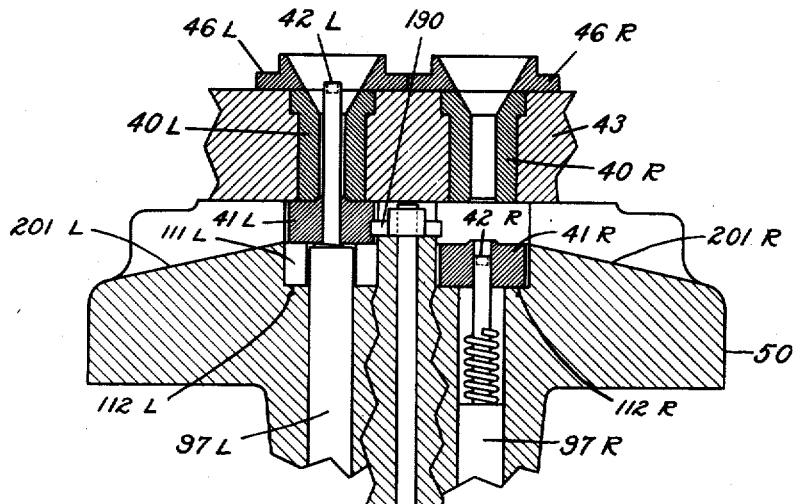
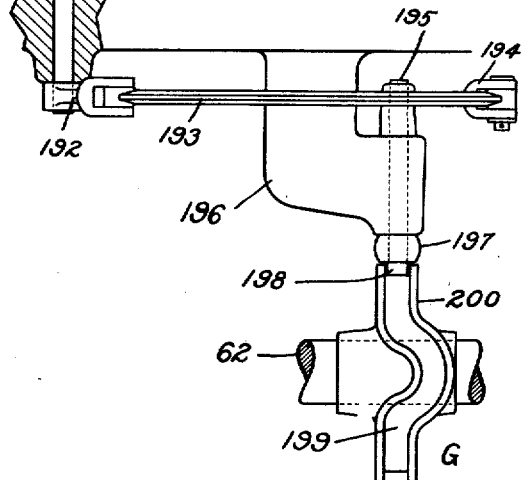
Fig. 16

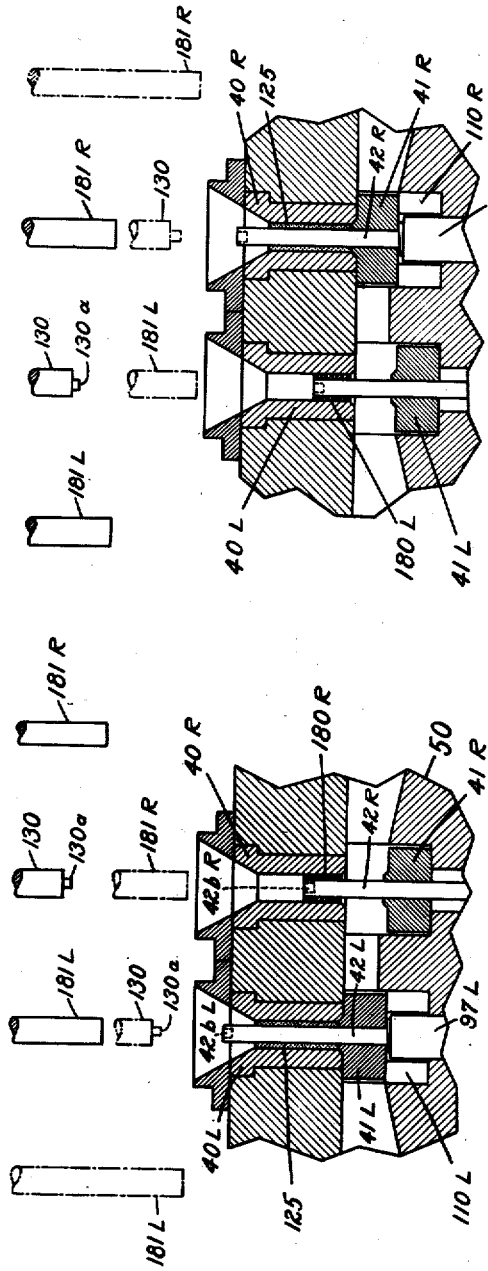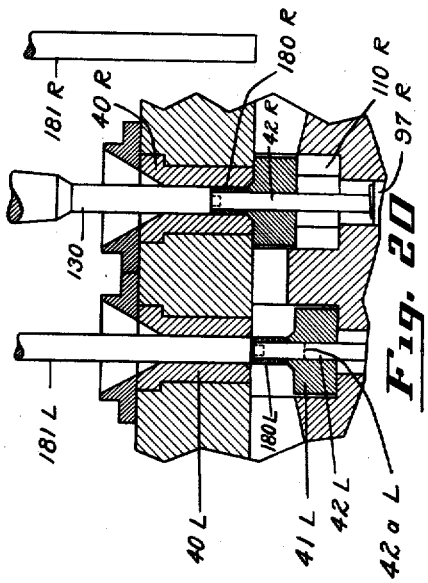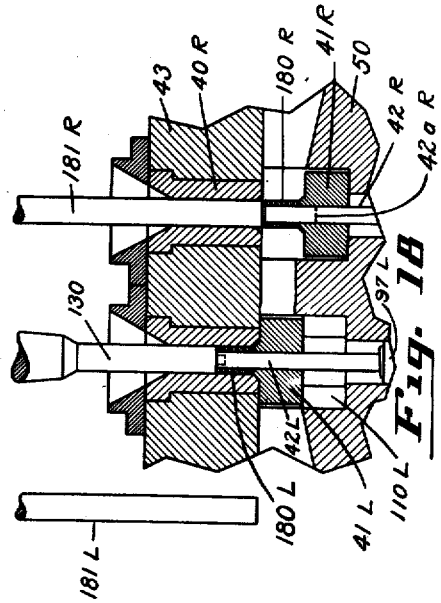

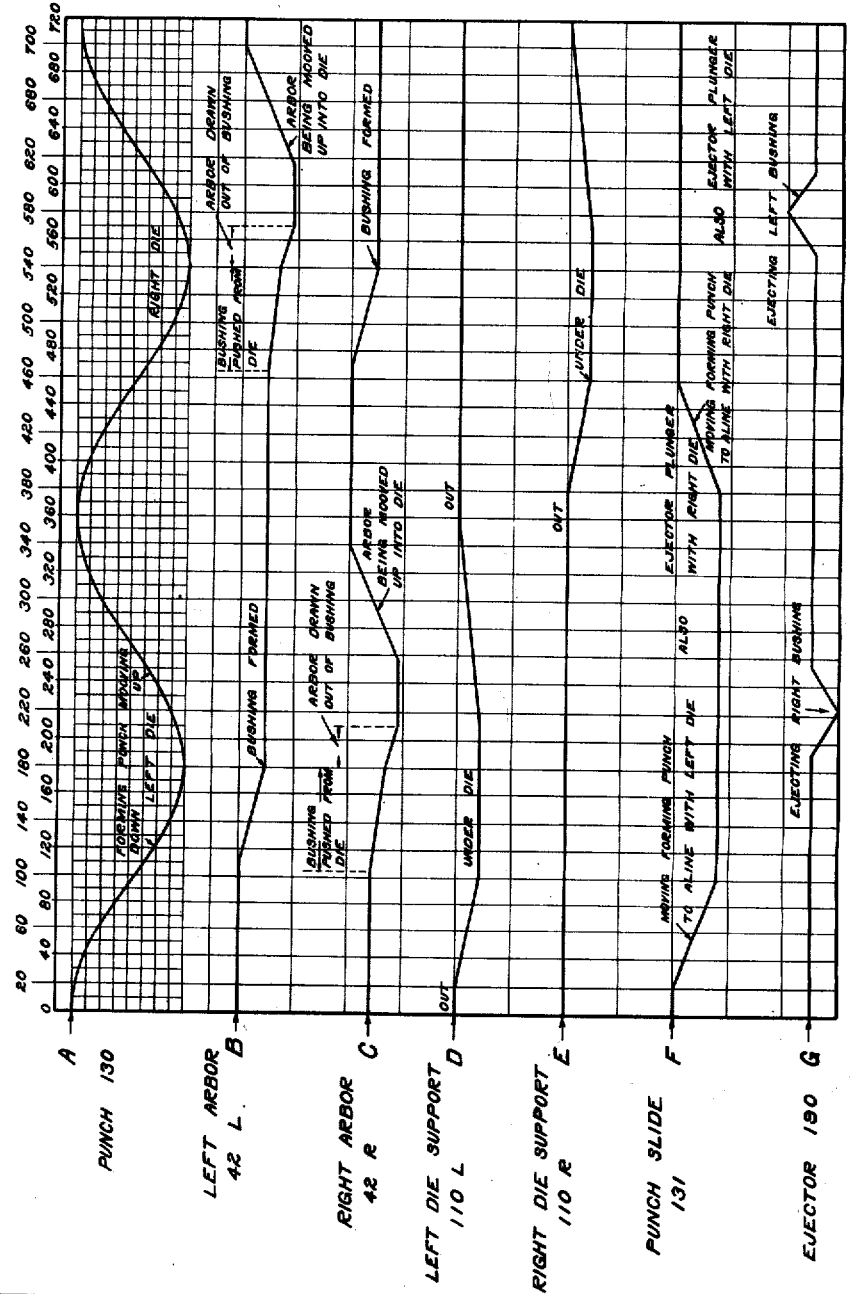

Patented Oct. 13, 1925.

1,556,699

UNITED STATES PATENT OFFICE.

CHARLES L. LEE, OF DAYTON, OHIO, ASSIGNOR TO GENERAL MOTORS RESEARCH CORPORATION, OF DAYTON, OHIO, A CORPORATION OF DELAWARE.

MOLDING MACHINE.

Application filed May 9, 1923. Serial No. 637,819.

*To all whom it may concern:*

Be it known that I, CHARLES L. LEE, a citizen of the United States of America, residing at Dayton, county of Montgomery, and State of Ohio, have invented certain new and useful Improvements in Molding Machines, of which the following is a full, clear, and exact description.

This invention relates to molding machines and particularly to machines of the type adapted to compress and mold powdered materials. The form of embodiment of the invention disclosed herein is adapted to mold hollow cylindrical bodies such as bushings.

One object of the invention is to produce molded articles more cheaply than heretofore.

Further objects are to facilitate the loading of the briquetting die with powdered material and the removal of the briquetted article from the die.

The invention broadly comprises a machine having a plurality of molds and mechanism for compressing material in one mold and simultaneously therewith ejecting compressed material from another mold.

Further objects and advantages of the present invention will be apparent from the following description, reference being had to the accompanying drawings, wherein a preferred form of embodiment of the present invention is clearly shown.

In the drawings:

Fig. 2 is a fragmentary side view on an enlarged scale showing the punch slide in one of its positions.

Fig. 3 is a view similar to Fig. 2 showing the punch slide in another position.

Fig. 4 is an end view of the punch slide and its operating mechanism.

Fig. 5 is a view showing in section the molding die with its base block in upper position, and, in elevation, the mechanism for controlling the die base block and the die arbor.

Fig. 6 is a view similar to Fig. 5 showing the die base block and the die arbor in lower position.

Fig. 7 is an elevation of the arbor cam follower arm.

Fig. 8 is a fragmentary view of the arbor actuating arm.

Fig. 9 is a fragmentary plan view of the arbor cam and follower arm.

Fig. 10 shows in section a die support in non-operative position and shows in elevation the mechanism for controlling the die support.

Fig. 11 is a view similar to Fig. 10 showing the die support in operative position.

Fig. 12 is a plan view partly in section of the die support.

Fig. 13 is an end view thereof.

Fig. 16 is an elevation partly in section showing the ejector mechanism corresponding to Fig. 14.

Figs. 17, 18, 19 and 20 show the relation of certain parts of the machine in successive stages of operation.

Fig. 21 is a chart showing the relation of functions performed by certain mechanisms of the machine for a complete cycle of machine operation or for two revolutions of the main operating shaft or crank shaft.

Figure 1:
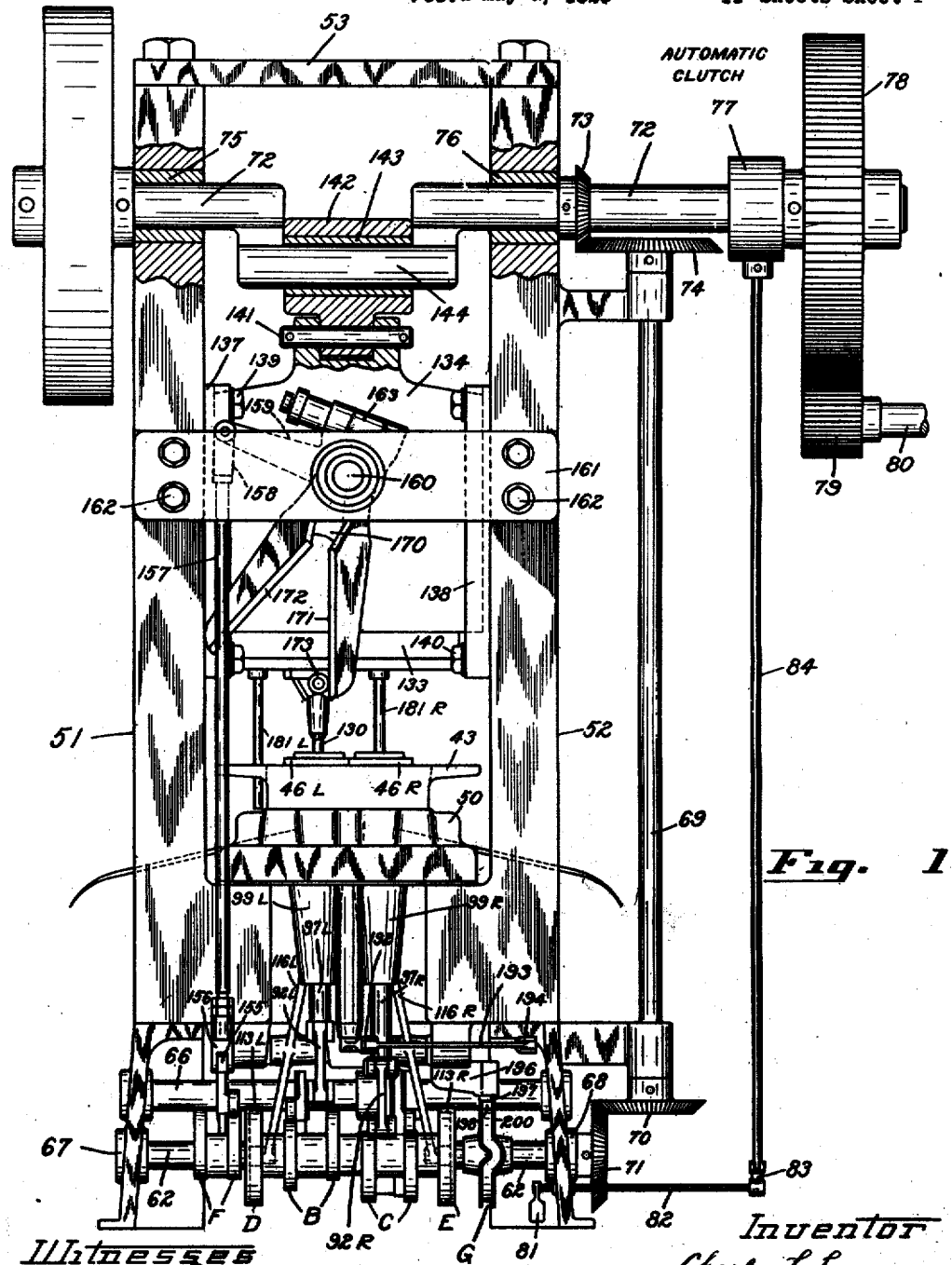
Fig. 1 is a side elevation of a machine for forming articles by compressing powdered material involving the present invention.

The machine embodying the present invention comprises in general four mechanisms, namely: (1) a receptacle for containing the finely divided material such as metallic powders, which will be known hereafter as the die or mold; (2) mechanism for periodically locating and clamping a removable end member of the die which will be known as the die base; (3) mechanism for compressing the powder within the die; (4) mechanism for removing the compressed material which will be known as the "work" from the die and machine.

*Powder containing die or mold.*

Referring to Figs. 5 to 9; the powder containing mold includes a cylindrical die member 40, a movable base block 41 and a retractible arbor 42 located centrally of the die 40 and projecting through an orifice in the block 41. If the work is not to be provided with an aperture, it is obvious that the arbor 42 would be omitted as a part of the mold. The die 40 is inserted into a suitable recess in a table 43 and is provided with a flared opening 44 in alignment with the flared opening 45 in a collar 46 which is secured to the table 43. The conical or flared openings 44 and 45 provide a chute for directing the powder into the space between the arbor 42 and the die 40.

For purpose to be described later, the table 43 is provided with two powder containers such as described, one being at the left of the center of the table, and the other at the right as viewed in Fig. 2. Therefore, for such of convenience, the parts of the left hand container will be designated by a reference numeral with the affix L and the corresponding parts at the right will be designated by same reference numerals accompanied with the affix R. The table 43 is supported on a cross frame member 50 which ties together the two principal frame members 51 and 52 of the molding machine. These side frame members 51 and 52 are connected at the top by cross bar 53.

*Die base locating and clamping mechanism.*

The die end member or base member 41 is removable from the die 40 and mechanism is provided for periodically moving the base 41 against the die 40 and clamping it in position in such a manner that it may retain within the die the powdered material when being compressed under relatively great pressure. This mechanism includes arbor cam plates 60 and 61 driven by cam shaft 62 cooperating with cam followers 63 and 64 respectively, mounted on follower arm 65 which oscillates on a fixed shaft 66.

Shaft 62 is mounted on bearings 67 and 68 provided by the side frames 51 and 52 respectively. Shaft 62 is driven from the shaft 69 by gearing 70 and 71 and shaft 69 is driven from the main or crank shaft 72 by means of gearing 73 and 74. The gear train is such that the cam shaft 62 will make one revolution for every two revolutions of the main shaft 72. Shaft 72 is journalled in bearings 75 and 76 provided by the side frames 51 and 52 respectively. Shaft 72 can be connected by means of a clutch 77 with a gear 78 which is loosely mounted on shaft 72 and meshes with a gear 79 attached to a power shaft 80 which may be driven by an electric motor. The clutch 77 is illustrated diagrammatically and is of a type used generally in punch presses, that is, it can be operated by means of a suitable foot pedal to cause the shaft 72 to be connected with the rotating gear 78, and, if the pedal be released then the shaft 72 will come to rest after having made one revolution. As this is a common form of clutch no further description is deemed necessary except to disclose a suitable foot pedal operated mechanism. This mechanism is shown diagrammatically in Fig. 1 and includes a pedal 81 connected with a shaft 82 which carries an arm 83 connected by rod 84 with the clutch 77. It will be understood that by pressing the pedal 81 the clutch will connect the shaft 72 and the gear 78 and the clutch will be automatically disengaged after one revolution of shaft 72 provided the pressure on the pedal 81 is released before the end of the revolution. From the foregoing it is apparent that each time the pedal 81 is operated the cam 62 will turn one revolution and then stop. The purpose of this will be described later.

The rocker arm 65 is provided with a lug 90 adapted to engage a lug 91 provided on lever 92 which is loosely journalled on rod 66 and includes an arm 93 connected by spring 94 with rocker arm 65. Arm 92 is connected by link 95 with a collar 96 attached to arbor actuating plunger 97 by means of a nut 98 threaded on the lower end of plunger 97. Plunger 97 is slidable within a guide 99 provided by the frame member 50 and supports centrally thereof the arbor 42 which is detachably secured to the plunger 97 by means of the shoulder 100 provided on arbor 42 and by means of a nut 101 threaded on the lower end of plunger 42 and bearing against a nut 98. A spring 102 is located around the arbor 42 and between the shoulder 100 and the die block 41. Spring 102 is received by cylindrical recess 103 provided in the plunger 97 above the shoulder 100. Arbor 42 is provided with a recess 42ᵇ for receiving a pilot on the forming punch to be described. The arbor is hollow in order that powder collecting on top of the arbor may fall through to the floor below the machine.

The shaft 62 rotates clockwise in Fig. 6 to cause plate 60 to engage roller 63 and move rocker 65 clockwise. Oscillation of the rocker 65 will cause the lever 92 to be moved from the position shown in Fig. 6 to the position shown in Fig. 5, through the action of the yielding spring connection 94. It is apparent the plunger 97 will be moved upwardly to cause the arbor 42 to project entirely above the block 41 and the cylindrical inner wall of the die 40. During this movement of plunger 97 the spring 102 will engage the underside of block 41 and push it against the lower end of die 40 with yielding pressure, the conical surface 47 of the base block 41 engaging with the counterbored companion surface 48 of die 40. The arbor 42 when retracted from the die may be slightly out of alignment with the die, but when the base block engages the die, the arbor is automatically centered with the die by the cooperating surfaces 47 and 48.

Further rotation of the cam shaft 62 will cause the plate 61 to engage the roller 64 and cause the rocker arm 65 to be rotated counterclockwise. The lug 90 will engage the lug 91 and positively cause the lever 92 to be rotated counterclockwise. Thereupon the plunger 97 will be lowered to the position shown in Fig. 6 and the block 41 will be released and permitted to fall by gravity from the position shown in Fig. 5 to that shown in Fig. 6.

The mechanism described locates the arbor and the die block in operative position. The mechanism for clamping the die block after being located will now be described.

The die block clamping mechanism includes a slidable support 110 mounted for horizontal movement in a suitable groove having an inclined bottom surface 112 in the frame member 50. Support 110 is provided with a forked end 111 constructed so as to clear the upper end of plunger 97 and insertable between said inclined surface 112 of the frame 50 and the undersurface of the die base block 41 as shown in Fig. 11. The support 110 is actuated between the positions shown in Fig. 10 and Fig. 11 by means of a box cam 113 mounted on cam shaft 62 and having a race 114 cooperating with a follower roller 115 mounted on one end of a lever 116 pivotally supported at 117 and connected at its upper end by link 118 with a clevis 119 which is threaded into a bushing 120 rotatably supported by a slide 110. Bushing 120 is retained in position by means of a shoulder 121 provided thereon, and by means of a nut 122 threaded upon the bushing. A lock nut 123 is threaded on the stem of the clevis 119. By loosening the nut 123 the bushing 120 may be turned so as to adjust the slide 110 with respect to its operating mechanism. Then the nut 123 may be clamped against these bushings 120 to maintain the clevis 119 in its adjusted position. Obviously, rotation of the cam 113 in clockwise direction will cause the mechanism to be moved intermittently from the position shown in Fig. 10 to that shown in Fig. 11 and then back to the original position.

*Powder compressing mechanism.*

When the parts of the mold are located as shown in Figs. 5 and 17 a predetermined quantity of finely divided material can be introduced between the arbor 42 and the die 40 as indicated at 125. The mechanism for compressing the powder 125 includes a punch 130 having a pilot 130ᵃ and attached to a punch slide 131 which is supported for horizontal sliding movement by a T-shaped groove 132 provided in a block 133 which is attached to a press head or plunger 134. The ends of the groove 132 are blocked by means of plates 135 attached by screws 136 so that endwise movement of the block 131 is limited. The press head 134 is supported for vertical sliding movement by means of gibs 137 and 138 attached by screws 139 and 140 to the frames 51 and 52 respectively.

The press head 134 is attached by a pin 141 with a link 142 having a bearing 143 for receiving a crank 144 provided by the shaft 72. Obviously rotation of shaft 72 will cause the head 134 and the punch 130 to enter one of the molds and compress the work therein.

The plunger 130 cooperates with the left and right hand molds alternately therefore mechanism has been provided for aligning the punch 130 alternately with the dies 40ᴸ and 40ᴿ. This mechanism includes punch slide operating cams 150 and 151 driven by shaft 62 and cooperating respectively with follower rollers 153 and 154 mounted on rocker arm 155 loosely journalled on rod 66 and attached to a clevis 156 connected by the rod 157 and a rod end 158 with an arm 159 pivoted on a shaft 160 carried by a cross frame member 161 attached by bolts 162 to side frames 51 and 52. The arm 159 includes a bifurcated portion 163, the branches of which each support a spring pressed plunger 164 adapted to engage a lug 165 extending from a hub 166 which is mounted on shaft 160 and supports a punch slide shifting yoke 170 having camming portions 171 and 172 adapted to cooperate with a roller 173 mounted on a bracket 174 attached to the slide 131.

Rotation of the cam plates 150 and 151 will cause the lever 155 to be oscillated and consequently the shifting yoke will actuate the slide 131 to align the punch 130 either with the die 40ᴸ or with die 40ᴿ. When the slide 131 contacts with the left hand end plate 135ᴸ the plunger 130 will be aligned with the die 40ᴸ as shown in Fig. 3. The travel of the arm 159 is slightly greater than enough to move the left hand end of slide 131 into contact with plate 135ᴸ, and overtravel is permitted since motion is transmitted from the lever 159 to one of the spring pressed plungers 164. Rotation of the cams 150 and 151 will cause the right hand end of slide 131 to engage the stop plate 135ᴿ as shown in Fig. 2. The downward movement of lever 159 from the position shown in Fig. 3 to that shown in Fig. 2 is more than enough to cause the right hand end of slide 131 to engage the stop plate 135ᴿ, and overtravel is permitted because motion is transmitted to one of the spring pressed plungers 164.

As shown in Fig. 3 the camming surface 171 is in a vertical position so that the plunger 130 may be lowered relative to the yoke 170 while the yoke remains in this position to maintain the plunger 130 in alignment with the die 40ᴸ. The slide 131 cannot move endwise because it is confined in one direction by the engagement with the end plate 135ᴸ and in the other direction because of the engagement of the roller 173 with the surface 171 of yoke 170.

When the slide 131 is in the position shown in Fig. 2, the camming surface 172 of yoke 170 will be vertical to permit the punch 130 to move vertically downward. During its movement the punch 130 is maintained in alignment with the die 40$^R$ because endwise movement of the slide 131 is prevented by the end plate 135$^R$ and by the engagement of roller 173 with the yoke surface 172.

Downward movement of the press head 134 will cause the plunger 130 to compress the powder 125 into the form of a hollow cylindrical member 180 shown in Fig. 18. This body may be termed for sake of convenience a "bushing" or the "work". After the work has been formed by the machine it is removed automatically by mechanism which will now be described.

Work removing mechanism.

The mechanism for removing the work includes ejecting plungers 181$^L$ and 181$^R$ mounted on the slide 131 and spaced from the plunger 130 at a distance equal to that between the vertical center lines of the dies 40$^L$ and 40$^R$ so that while the material in die 40$^L$ is being compressed by plunger 130, the work previously formed in die 40$^R$ can be ejected as will be apparent from Figs. 17 and 18 and also so that the work previously formed in die 40$^L$ can be ejected while the powder 125 is being compressed in the die 40$^R$ as is apparent from Figs. 19 and 20.

Referring to Figs. 17 and 18, the downward movement of the ejecting plunger 181$^R$ causes the bushing 180$^R$ to be forced out of the die 40$^R$ while the arbor 42$^R$ is being withdrawn from the die 40$^R$. This operation takes place after the block 41$^R$ has been released by its clamping mechanism so that it may fall by gravity into a suitable pocket or receptacle provided by the frame 50. The mechanism for actuating the plunger 42$^R$ will draw it below the upper side of the block 41$^R$ as shown in Fig. 18, thereby causing the bushing 180$^R$ to be stripped from the arbor and to rest upon the block 41$^R$.

Figure 15:
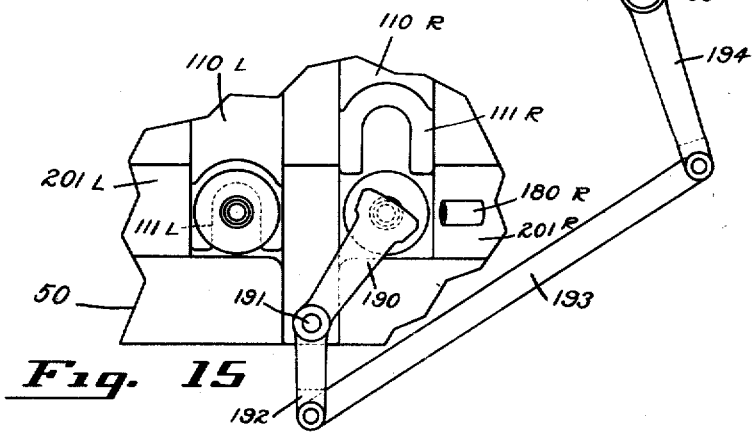
Fig. 15 is a view similar to Fig. 14 showing the ejected mechanism in one of its operative positions.

Mechanism has been provided for ejecting the work from the machine after it has been stripped from the arbor. This mechanism includes an ejecting arm 190 attached to a shaft 191 pivoted upon the frame 50 and connected by arm 192 and link 193 with lever arm 194 attached to shaft 195 rotatably mounted on bracket 196 provided by the machine frame. Shaft 195 carries arm 197 provided with a cam following roller 198 which cooperates with the race 199 of the drum cam 200. The cam 200 is constructed so that for every two revolutions of the crank shaft 72, the arm 190 will be shifted alternately toward the base blocks 41$^L$ and 41$^R$ in order to knock off a bushing which has been located on a base block. In Fig. 15 the arm 190 has been actuated so as to knock off a bushing 180$^R$ from the right hand die block and bushing 180$^R$ will slide or roll down an incline chute 201$^R$ into a suitable receptacle provided at the side of the machine.

Operations occurring during one machine cycle.

Heretofore the operations of separate mechanisms of the machine have been described. The machine however provides for alternately compressing material in two molds, therefore, in order to understand the entire machine, it will be necessary to describe its operation with respect to the two molds. The following description is made particularly with reference to Figs. 17 to 21 inclusive. In Fig. 21 curve A indicates the movements of the punch 130 for two revolutions of the crank shaft 72. The curve B indicates the corresponding movements of the left arbor 42$^L$. The cam plates comprising the cam for controlling the left arbor are indicated at B in Fig. 1. The curve C shows the corresponding movements of the right arbor 42$^R$ and the cam which controls 42$^R$ is indicated at C in Fig. 1. The curve D indicates the corresponding movements of the left die support 110$^L$ and the cam for controlling support, 110$^L$ is indicated at D in Fig. 1 and also by 113$^L$. The movements of the right die support 110$^R$ are indicated by curve E, and E designates the cam for controlling 110$^R$ also referred to as 113$^R$. Curve F designates the movements of punch slide 131 and the cams for controlling the slide 131 are designated by F in Fig. 1. Curve G designates the corresponding movements of the ejector 190 and the ejector cam is designated by letter G in Fig. 1 and also by numeral 200.

Cams B, C, D, E, F and G are all located upon the shaft 62 which is timed with respect to the shaft 72 so that the various functions of the machine will occur in the order indicated by cam chart, Fig. 21.

Figure 14:
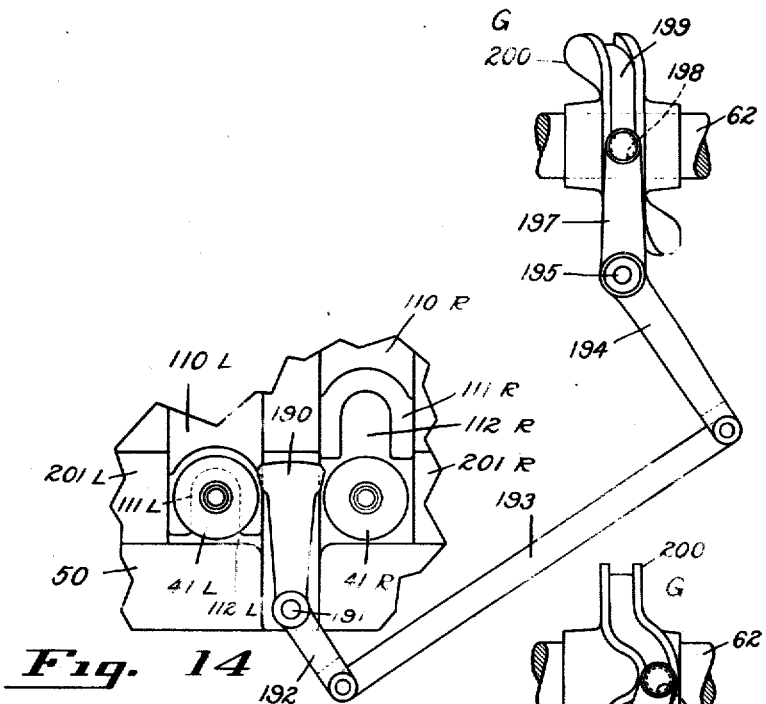
Fig. 14 is a plan view of the ejecting mechanism in non-operative position.

Assuming that the machine is at rest, and that the location of the parts will be as indicated by the zero degree line in Fig. 21, Figs. 2 and 17 show the location of certain parts in accordance with the zero degree line. As indicated in Figs. 2 and 17, the ejecting punch 181$^L$ and the forming punch 130 are aligned respectively with the dies 40$^L$ and 40$^R$ and the ejecting plunger 181$^R$ is in non-operating position. The left arbor 42$^L$ is in uppermost position and the right arbor 42$^R$ in partly retracted position. The left die support 110$^L$ is in non-operating position but the die block 41$^L$ is resiliently pressed against the bottom of the die 40$^L$. The right die support 110$^R$ is retracted to permit the die block 41$^R$ to be received by a recess in the frame 50. The ejector 190 is located in non-operating position as shown in Fig. 14. While the machine is at rest, a determined quantity of finely divided materials (metallic powder for metallic bearings) is poured into the left hand mold as indicated at 125 in Fig. 17. The operator presses the treadle 81 causing the crank shaft 72 to make one revolution and then stop at a position corresponding to the 360 degree line in Fig. 21.

As the punch 130 descends, the punch slide 131 starts to move to the left at 20° and is completely moved to the left at 100° crank shaft revolution, as indicated by curve F at the same time the left die support $110^L$ moves into a clamping position as indicated by curve D. During this period the left arbor, the right arbor, the right die support and the ejector remain stationary. The movement of the punch slide 131 has brought the ejecting punches and the forming punch into positions indicated by dot and dash lines in Fig. 17. The ejecting plunger $181^L$ is in non-operating position, the forming punch 130 is aligned with the die $40^L$, and the ejecting plunger $181^R$ is aligned with the die $40^R$.

Beginning at about 105°, the lower end of punch 130 will engage the upper end of arbor $42^L$, the pilot $130^a$ being received by the bore of the arbor to maintain the arbor concentric with the die. The arbor $42^L$ will be moved downwardly by the punch 130 until the 180° movement is reached, at which time the punch is in lowest position and the compressing of the powder is completed to form the "work" or bushing $180^L$. The location of the parts corresponding to 180° of crank shaft movement is as shown in Figs. 1 and 18. Left arbor $42^L$ has been actuated by the plunger while its cam B has been turned a certain amount sufficient to retain the arbor $42^L$ in the position shown in Fig. 18 after the punch recedes from it. Should the arbor travel down faster than determined by the cam B, the spring 94 shown in Fig. 6 will be stretched allowing lever 92 to rotate faster than the rocker arm 65. The lugs 90 and 91 will be separated in case the lever 92 should move faster than the rocker 65, but after the plunger 130 recedes from the arbor $42^L$ the lugs 90 and 91 will be engaged through the action of spring 94 so that the cam B will be effective to locate the arbor $42^L$. During the first downward movement of the press head 134 the ejecting plunger $181^R$ will engage the work $180^R$ and the arbor $42^R$ and will push them downwardly beginning at about 150° and ending with 180°, thereby causing both the work and the arbor $42^R$ to be ejected from the die $40^R$. Beginning at 180° and ending with 210° the cam C will draw the arbor $42^R$ partly through the base block $41^R$ as indicated by the dotted line $42^{aR}$ in Fig. 18.

This movement causes the work $180^R$ to be stripped from the arbor $42^R$ and rest upon the block $41^R$. At about 190° the ejector 190 begins to move from its position shown in Fig. 14 and arrives at position shown in Fig. 15 at about 225°. This movement causes the work $180^R$ to be knocked off the block $41^R$ and to slide down a chute $201^R$. The ejector 190 returns to non-operating position at about 255°.

Figs. 3 and 19 show the location of certain parts corresponding to the 360° line in Fig. 21. The punch 130 and ejecting plungers have moved to uppermost position, and during this movement the arbor $42^R$ has moved to uppermost position and the block $41^R$ is resiliently supported against the bottom of the die $40^R$ so that the right hand mold is ready for receiving powdered material. At this time the arbor $42^L$ remains in partly retracted position and the left die support $110^L$ has been withdrawn from under the die $40^L$ permitting it to drop down into the lower position shown in Fig. 19. At this time the right die support $110^R$ is in non-operating position.

As explained before, the machine comes to rest automatically at the end of one crank shaft revolution. While the machine is at rest, the right hand mold is filled with material 125. The operator then presses the pedal 81 causing the machine to start and the crank shaft to make one revolution designated on the chart by 360° to 720°. Beginning at 380° and ending with 460°, the slide 131 is moved to the right in order to locate the punch 130 and the ejecting plungers $181^L$ and $181^R$ in position indicated by dot and dash lines in Fig. 19. At 460° the ejecting plunger $181^L$ and the punch 130 will be aligned respectively with the dies $40^L$ and $40^R$ and the plunger $181^R$ will be in non-operative position. The right die support $110^R$ will have moved under the die $40^R$ at 460° and will remain in clamping position until about 570° and then will return to non-operating position at 720°. As the press head descends the punch 130 will engage the arbor $42^R$ beginning at about 465° and these parts will continue in engagement until 540° at which time the powder has been compressed to complete the "work" or bushing $180^R$. The pilot $130^a$ is received by recess $42^{bR}$ so that punch 130 will maintain the arbor $42^R$ concentric to the die $40^R$.

Fig. 20 shows certain parts of the apparatus in positions corresponding to 540° crank shaft movement. At this time, the left arbor $42^L$ and the work $180^L$ have been ejected from the die $40^L$ by the plunger $181^L$ as shown in Fig. 20. From 540° to 570° the cam C is operative to draw the arbor $42^L$ down into the position indicated by the dotted line $42^{aL}$ thereby causing the work $180^L$ to be stripped from the arbor $42^L$ and to rest upon the block 41$^L$. The arbor 42$^L$ remains in lowest position until about 615° and then returns to highest position at about 700° so as to be ready for a repetition of the machine cycle. From about 550° to about 585° the ejector 190 moves toward the die block 41$^L$ and knocks off the bushing 180$^L$ causing it to move down the chute 201$^L$. At about 610° the ejector 190 turns to non-operating position. The work 180$^R$ and the arbor 42$^R$ remain in the position shown in Fig. 20 until the end of the machine cycle. The right die support 110$^R$ will have been withdrawn at the end of the cycle to allow the die block 41$^R$ to drop down into the position shown in Fig. 17. At 700° the sleeve 97$^L$ will have moved upwardly to cause the die block 41$^L$ to be resiliently pressed against the bottom of the die 40$^L$. The left hand mold will therefore be in position for receiving a charge of powder. Then the cycle of operations can be repeated.

While the form of embodiment of the present invention as herein disclosed, constitutes a preferred form, it is to be understood that other forms might be adopted, all coming within the scope of the claims which follow.

What I claim is as follows:

1. In a machine of the kind described, the combination with means for receiving finely-divided material, including a mold and a removable end member therefor; means for periodically moving the end member against the mold; means for periodically clamping said member rigidly against the mold; means for compressing the material in the mold while said end member is rigidly clamped against the mold; and means for ejecting the compressed material from the mold when the member is separated for said mold.

2. In a machine of the kind described, the combination with means for receiving finely-divided material, including a mold and a removable end member therefor; means for periodically moving the end member against the mold; a wedge periodically operable to clamp said member rigidly against the mold; a plunger for compressing the material in the mold while said end member is rigidly clamped against the mold; and another plunger for ejecting the compressed material from the mold when the member is separated from said mold.

3. In a machine of the kind described, the combination with means for receiving finely-divided material, including a mold and a removable end member therefor; means for periodically moving the end member against the mold; a wedge constructed and arranged rigidly to clamp the end member against the mold and to permit the end-member-moving means to move away from the said member; means for compressing the material in the mold while the end member is rigidly being held against the mold; means for removing the wedge when the compression operation is completed; and means for ejecting the compressed material from the mold when the end member is separated therefrom after removal of the wedge.

4. In a machine of the kind described, the combination with means for receiving finely divided material including a mold and a removable end member therefor; of means for periodically moving and clamping said end member against the mold and then releasing said member; and means for compressing the material within the mold while said member is clamped in position; means for ejecting the compressed material endwise from the mold and causing said material to be supported by the end member; and means for removing the material from the end member.

5. In a machine of the kind described, the combination with means for receiving finely divided material including a mold having a filler opening at the top thereof, and including a base block removable from the bottom of the mold, of means for periodically moving and clamping the base block against the mold and then permitting the block to drop away from the die; a forming punch vertically movable into the mold for compressing the material in the mold against the block; and means for removing the compressed material through the bottom end of the mold when the base block is separated therefrom.

6. In a machine of the kind described, the combination with means for receiving finely divided material including a mold having a filler opening at the top thereof, and including a base block removable from the bottom of the mold; of means for periodically moving and clamping the base block against the mold and then permitting the block to drop away from the mold; a forming punch vertically movable into the mold for compressing the material in the mold against the block; means for pushing the compressed material out through the bottom of the mold and onto the supporting block when the block is separated from the mold; and means for removing the material from the block.

7. In a machine of the kind described, the combination with means for receiving finely divided material including a mold having a filler opening at the top thereof, and including a base block removable from the bottom of the mold; of means for periodically moving the base block against the mold; means for clamping the base block in operative position and then releasing the base block, said moving means permitting the base block to drop away from the mold; means for compressing the material in the mold against the base block; and means for removing the compressed material from the mold.

8. In a machine of the kind described, the combination with a mold for receiving finely-divided material; an arbor extending into the mold; means for compressing said material against the arbor and walls of the mold; means for moving the arbor with the compressing means when the latter is compressing the material; means for removing the compressed material and arbor from the mold; and means for withdrawing the arbor from the material.

9. In a machine of the kind described, the combination with a mold for receiving finely-divided material; an arbor extending into the mold; means for compressing said material against the arbor and walls of the mold; means for moving the arbor with the compressing means when the latter means is compressing the material; and means for removing the material from the mold.

10. In a machine of the kind described, the combination with a mold for receiving finely-divided material; an arbor extending into the mold and including a bore in its end; a plunger punch having a pilot adapted to enter the bore of the arbor, said punch being constructed and arranged to concurrently move the arbor through the mold and compress the material against the arbor and walls of the mold; means for removing the compressed material and arbor from the mold; and means for withdrawing the arbor from the compressed material.

11. In a machine of the kind described, the combination with a mold for receiving finely-divided material; a removable end member for the mold; a forming punch constructed and arranged snugly to fit into said slide through the mold; an arbor extending through the end member into the mold, said arbor having a sliding bearing in the end member and being of lesser transverse dimension than the forming punch; means for moving the forming punch into the mold for compressing the material therein, and supporting means between the forming punch and arbor which cooperates with the end member for maintaining the arbor in correct relative position in the mold when said arbor is moved through said mold by the movement of the punch into said mold.

12. In a machine of the kind described, the combination with means for receiving finely-divided material including a mold and a removable end member therefor; an arbor extending through said end member and into the mold; means for periodically locating and rigidly clamping said end member against the mold; means constructed and arranged to move the arbor through the mold and end member and at the same time compress the material in the mold against the arbor and walls of the mold; means for removing the compressed material and arbor from the mold; and means for withdrawing the arbor from the compressed material.

13. In a machine of the kind described, the combination with a mold for receiving finely-divided material, said mold including a removable end member; an arbor extending through said end member and into the mold; means for periodically locating and rigidly clamping said end member against the mold; means constructed and arranged to move the arbor through the mold and end member and at the same time compress the material in the mold against the arbor and walls of the mold; and means for removing the compressed material from the mold and from the arbor.

14. A machine of the kind described, comprising in combination, a mold for receiving finely-divided material; an end member for the mold and including an extended portion adapted to enter the mold; means for moving said end member against the mold so that the extended portion enters the mold; and means for rigidly wedging the said end member against the mold.

15. A machine of the kind described, comprising in combination, a mold for receiving finely-divided material; an end member for the mold and including an extended portion adapted to enter the mold; means for moving said end member against the mold so that the extended portion enters said mold; means for rigidly wedging the end member against the mold; an arbor having a sliding bearing in said end member and so constructed and arranged as to extend into the mold; a forming punch; and means for moving the forming punch into the mold to compress the material in said mold and at the same time cause the punch to push the arbor through the mold.

16. In a machine of the kind described, the combination with means for receiving finely divided material including a mold and a removable end member therefor, and including an arbor located within the mold; of means for periodically locating and clamping said end member against the mold; means for compressing the material against the arbor and walls of the mold; and means for removing the material from the machine.

17. In a machine of the kind described, the combination with means for receiving finely divided material including a mold, a removable end member therefor, and including an arbor located within the mold and projecting through the end member; of means for periodically located and clamping said end member against the mold; means for compressing the material against the arbor and walls of the mold; means for removing the arbor and material from the mold when the end member is separated therefrom; and means for moving the arbor through the end member to strip the material from the arbor.

18. In a machine of the kind described, the combination with means for receiving finely divided material including a mold having a filler opening at the top thereof, including a base block removable from the bottom of the mold, and including an arbor projecting through the base block into the mold; of means for periodically moving and clamping the base block against the mold and then permitting the block to drop away from the mold; a forming punch vertically movable into the mold or compressing the material in the mold against the block and arbor; means for removing the arbor and material from the mold when the base block is separated from the die; and means for removing the arbor through the block to strip off the material.

19. In a machine of the kind described, the combination with means for receiving finely divided material including a mold having a filler opening at the top thereof, including a base block removable from the bottom of the mold, and including an arbor projecting through the base block into the mold; of means for periodically moving the base block against the mold; means for clamping the base block in operative position and then releasing the base block, said moving means permitting the base block to drop away from the mold; means for compressing the material in the mold against the base block and arbor; means for removing the arbor and material from the bottom of the mold when the base block is separated therefrom; and means for moving the arbor through the base block to strip off the work.

20. In a machine of the kind described, the combination with means for receiving finely divided material including a mold and a removable end member therefor, and including an arbor located within the mold; of means for periodically locating and rigidly clamping said end member against the mold; means for compressing the material against the arbor and walls of the mold; means for removing the material from the arbor; and means for removing the material from the end of the mold adjacent the said end member when said member is separated from the mold, and for removing the material from the machine.

21. In a machine of the kind described, the combination with means for receiving finely divided material including a mold having a filler opening at the top thereof, including a base block removable from the bottom of the mold, and including an arbor projecting through a base block into the mold; of means for periodically moving and clamping the base block against the mold and then permitting the block to drop away from the die; a forming punch vertically movable into the mold for compressing the material in the mold against the block and arbor; means for removing the material from the arbor; and means for removing the material from the mold through the bottom of the mold when the base block is separated therefrom.

22. In a machine of the kind described, the combination with a plurality of molds each having a removable end member; means for moving one end member against its mold and rigidly clamping it against said mold while permitting the other end member to be released and moved away from its mold; and a frame member supporting a forming punch and ejecting plungers and adapted to move in one direction for compressing material in one mold while removing compressed material from the other mold.

23. In a machine of the kind described, the combination with a plurality of molding dies each having a filler opening at its upper end, and each having a removable base block; means for moving a base block against a die and clamping it in position while permitting the other base block to be separated from its respective die; and means for compressing the material in one die while removing compressed material from another die through the bottom thereof.

24. In a power-driven machine of the kind described, the combination with a plurality of molding dies; of a forming punch; an ejecting plunger; a common support for said punch and plunger; power-driven means for moving said support whereby alternately to align the punch with a die and a plunger with a die; and means for moving said support toward the dies.

25. In a power-driven machine of the kind described, the combination with a plurality of molding dies located with their axes vertical and parallel; of a vertically movable forming punch; a vertically movable ejecting plunger; a common support for said punch and plunger; power-operated means for moving said support horizontally whereby alternately to align the punch with a die and a plunger with a die; and means for moving said support toward the dies.

26. In a power-driven machine of the kind described, the combination with two molding dies arranged with their axes parallel; a forming punch for cooperating with either die; an ejecting plunger for each die; common means arranged on one side of the die for supporting said punch and plungers with the punch disposed between the plungers and at a distance from each plunger equal to the distance between the axes of the dies; power-driven means for moving said support whereby alternately to align the punch with a die and a plunger with a die; and means for moving said support toward the dies.

27. In a power-driven machine of the kind described, the combination with a plurality of molding dies located with their axes parallel and vertical; of a forming punch for successively cooperating with the dies; a support for said punch; and power-operated means for moving the support horizontally to align the punch with one of the dies and for moving the support vertically to cause the punch to enter one of the dies.

28. In a power-driven machine of the kind described, the combination with a plurality of dies disposed with their axes vertical; of a punch for cooperating with either of said dies; a horizontally slidable support for said punch; and power-operated means for shifting the support to successively align the punch with the dies, said means maintaining alignment while permitting the punch and support to move vertically; and power-operated means for moving the support vertically.

29. In a machine of the kind described, the combination with a plurality of molds disposed with their axes vertical; of a punch for cooperating with either of said molds; a horizontally slidable support for said punch; a roller mounted on said punch support; a pivotally mounted shifting yoke having branches each adapted to engage the roller to shift the punch support; and means for rocking the yoke in either direction.

30. In a machine of the kind described, the combination with two molds disposed with their axes vertical; of a punch for cooperating with either of said molds; a horizontally slidable punch supporting slide; stops for limiting the travel of the slide in either direction; and means for shifting the slide in either direction against a stop and maintaining it in said position while permitting vertical movement of said slide and punch; and means for molding the slide vertically.

31. In a machine of the kind described, the combination with two molds disposed with their axes vertical; of a punch for cooperating with either of said molds; a horizontally slidable punch supporting slide; stops for limiting the travel of the slide in either direction; and means for shifting the slide in either direction against a stop and maintaining it in said position under yielding pressure while permitting vertical movement of said slide and punch; and means for moving the slide vertically.

32. In a machine of the kind described, the combination with a plurality of molds; of a plurality of arbors each for projecting into a mold; and means for alternately locating one arbor in a mold in a manner such that material can be placed within the mold about said arbor while maintaining another arbor within a quantity of compressed material in another mold.

33. In a machine of the kind described, the combination with a plurality of arbors each insertable into a mold; and means for compressing material in one mold around its arbor while removing compressed material and the arbor from another mold.

34. In a machine of the kind described, the combination with a plurality of arbors each insertable into a mold; and means for compressing material in one mold around its arbor while removing compressed material and the arbor from another mold, and then stripping the compressed material from said other arbor.

35. In a machine of the kind described, the combination with a plurality of arbors each insertable into a mold, and means for compressing material in one mold around its arbor while removing compressed material and the arbor from another mold, and then stripping the compressed material from said other arbor and then ejecting said compressed material from the machine.

36. In a machine of the kind described, the combination with a plurality of arbors each insertable into a mold; and means for compressing material in one mold around its arbor while removing compressed material and the arbor from another mold, then stripping the compressed material from said other arbor, then ejecting said compressed material from the machine, and then inserting said other arbor in said other mold.

37. In a machine of the kind described, the combination with a plurality of molds, each having a removable base block; of means for alternately moving one of said base blocks toward one of the molds and clamping it against said mold while permitting the other block to be released and to be separated from the other mold; of a plurality of arbors each projecting through a base block into a mold; and means for compressing material in one mold against its block and arbor while removing the compressed material and arbor from the lower end of another mold while its base block is separated therefrom.

38. In a machine of the kind described, the combination with a plurality of molds, each having a removable base block; of means for alternately moving one of said base blocks toward one of the molds and clamping it against said mold while permitting the other block to be released and to be separated from the other mold; of a plurality of arbors each projecting through a base block into a mold; and means for compressing material in one mold against its block and arbor while removing the compressed material and arbor from the lower end of another mold while its base block is separated therefrom, and then moving said other arbor to said other base block to strip the compressed material from said other arbor.

39. In a machine of the kind described, the combination with a plurality of molds, each having a removable base block, of means for alternately moving one of said base blocks toward one of the molds and clamping it against said mold while permitting the other block to be released and to be separated from the other mold; of a plurality of arbors each projecting through a base block into a mold; and means for compressing material in one mold against its block and arbor while removing the compressed material and arbor from the lower end of another mold while its base block is separated therefrom, then moving said other arbor to said other base block to strip the compressed material from said other arbor, and then for ejecting said compressed material from the machine.

40. In a machine of the kind described, the combination with a molding die; of an arbor insertable into the die and spaced from the side walls thereof; a forming punch insertable into the die for compressing the material between the die and arbor; means for moving the arbor into the die in one direction; and means for moving the punch and arbor simultaneously in the opposite direction during which time the compressing of the material is taking place.

41. In a machine of the kind described, the combination with a molding die; of an arbor insertable into the die and spaced from the side walls thereof; a forming punch insertable into the die for compressing the material between the die and arbor; means for moving the arbor into the die in one direction, said means permitting the arbor to be moved in the opposite direction independently of said means; and means for moving the punch into engagement with the arbor in said opposite direction and then causing the punch and arbor to move together in said opposite direction.

42. In a machine of the kind described, the combination with a molding die, of an arbor movable into the die from one end thereof and spaced from the walls of the die; of a punch insertable into the die from the other end thereof; means for guiding the punch to prevent sidewise movement thereof; means for causing the punch to engage the arbor and the punch and arbor to move simultaneously through the die; and cooperating provisions on the punch and arbor whereby sidewise movement of the arbor is prevented by the punch after said punch engages the arbor.

43. In a machine of the kind described, the combination with a molding die; of an arbor movable into the die from one end thereof and spaced from the walls of the die, said arbor having a recess provided in the end insertable into the die; of a punch insertable into the die from the other end thereof and having a pilot adapted to be received by said recess in the arbor; means for guiding the punch to prevent sidewise movement thereof; means for causing the punch to engage the arbor and the punch and arbor to move simultaneously through the die, said pilot by engaging said recess preventing sidewise movement of the arbor with respect to the die.

In testimony whereof I hereto affix my signature.

CHARLES L. LEE.

to strip the compressed material from said other arbor.

39. In a machine of the kind described, the combination with a plurality of molds, each having a removable base block, of means for alternately moving one of said base blocks toward one of the molds and clamping it against said mold while permitting the other block to be released and to be separated from the other mold; of a plurality of arbors each projecting through a base block into a mold; and means for compressing material in one mold against its block and arbor while removing the compressed material and arbor from the lower end of another mold while its base block is separated therefrom, then moving said other arbor to said other base block to strip the compressed material from said other arbor, and then for ejecting said compressed material from the machine.

40. In a machine of the kind described, the combination with a molding die; of an arbor insertable into the die and spaced from the side walls thereof; a forming punch insertable into the die for compressing the material between the die and arbor; means for moving the arbor into the die in one direction; and means for moving the punch and arbor simultaneously in the opposite direction during which time the compressing of the material is taking place.

41. In a machine of the kind described, the combination with a molding die; of an arbor insertable into the die and spaced from the side walls thereof; a forming punch insertable into the die for compressing the material between the die and arbor; means for moving the arbor into the die in one direction, said means permitting the arbor to be moved in the opposite direction independently of said means; and means for moving the punch into engagement with the arbor in said opposite direction and then causing the punch and arbor to move together in said opposite direction.

42. in a machine of the kind described, the combination with a molding die, of an arbor movable into the die from one end thereof and spaced from the walls of the die; of a punch insertable into the die from the other end thereof; means for guiding the punch to prevent sidewise movement thereof; means for causing the punch to engage the arbor and the punch and arbor to move simultaneously through the die; and cooperating provisions on the punch and arbor whereby sidewise movement of the arbor is prevented by the punch after said punch engages the arbor.

43. In a machine of the kind described, the combination with a molding die; of an arbor movable into the die from one end thereof and spaced from the walls of the die, said arbor having a recess provided in the end insertable into the die; of a punch insertable into the die from the other end thereof and having a pilot adapted to be received by said recess in the arbor; means for guiding the punch to prevent sidewise movement thereof; means for causing the punch to engage the arbor and the punch and arbor to move simultaneously through the die, said pilot by engaging said recess preventing sidewise movement of the arbor with respect to the die.

In testimony whereof I hereto affix my signature.

CHARLES L. LEE.

CERTIFICATE OF CORRECTION.

Patent No. 1,556,699.　　　　　　　　　Granted October 13, 1925, to

CHARLES L. LEE.

It is hereby certified that error appears in the printed specification of the above numbered patent requiring correction as follows: Page 1, line 20, for the word "briquetting" read "molding", and line 21, for "briquetted" read "molded"; page 5, line 59, for "150°" read "105°"; page 6, line 40, claim 1, for the word "for" read "from"; same page, line 92, claim 5, for the word "die" read "mold"; page 8, line 18, claim 18, for "die" read "mold"; page 9, line 43, claim 30, for "molding" read "moving"; page 10, line 47, claim 42, for "in" read "In"; and that the said Letters Patent should be read with these corrections therein that the same may conform to the record of the case in the Patent Office.

Signed and sealed this 26th day of November, A. D. 1929.

(Seal)

M. J. Moore,
Acting Commissioner of Patents.

CERTIFICATE OF CORRECTION.

Patent No. 1,556,699.                 Granted October 13, 1925, to

CHARLES L. LEE.

It is hereby certified that error appears in the printed specification of the above numbered patent requiring correction as follows: Page 1, line 20, for the word "briquetting" read "molding", and line 21, for "briquetted" read "molded"; page 5, line 59, for "150°" read "105°"; page 6, line 40, claim 1, for the word "for" read "from"; same page, line 92, claim 5, for the word "die" read "mold"; page 8, line 18, claim 18, for "die" read "mold"; page 9, line 43, claim 30, for "molding" read "moving"; page 10, line 47, claim 42, for "in" read "In"; and that the said Letters Patent should be read with these corrections therein that the same may conform to the record of the case in the Patent Office.

Signed and sealed this 26th day of November, A. D. 1929.

(Seal)                                                     M. J. Moore,
                                                           Acting Commissioner of Patents.